US008908362B2

(12) United States Patent
 Wang

(10) Patent No.: US 8,908,362 B2
(45) Date of Patent: Dec. 9, 2014

(54) FOLDABLE KEYBOARD

(71) Applicant: Dexin Corporation, New Taipei (TW)

(72) Inventor: Ting-Sheng Wang, New Taipei (TW)

(73) Assignee: Dexin Corporation, New Taipei (TW)

( * ) Notice: Subject to any disclaimer, the term of this patent is extended or adjusted under 35 U.S.C. 154(b) by 210 days.

(21) Appl. No.: 13/681,664

(22) Filed: Nov. 20, 2012

(65) Prior Publication Data

US 2014/0055936 A1   Feb. 27, 2014

(30) Foreign Application Priority Data

Aug. 23, 2012 (TW) .............................. 101216283 U

(51) Int. Cl.
 *G06F 1/16* (2006.01)
 *G06F 3/02* (2006.01)
(52) U.S. Cl.
 CPC ............ *G06F 1/1669* (2013.01); *G06F 3/0221* (2013.01)
 USPC .................... 361/679.13; 455/575.3; 400/489; 200/341
(58) Field of Classification Search
 USPC ............... 455/566, 575.8, 41.2, 575.3, 575.1, 455/556.1, 418, 517, 435.3, 310, 412.1; 345/168, 169, 173, 174, 156, 87, 623, 345/179, 204, 161; 361/679.09, 679.15, 361/679.01, 679.08, 679.29, 679.32, 361/679.03, 679.04, 679.06, 679.4, 679.27, 361/679.43, 679.41, 679.55, 679.59; 400/472, 485, 480, 486, 489, 691, 488
 See application file for complete search history.

(56) References Cited

U.S. PATENT DOCUMENTS

2004/0195305 A1* 10/2004 Dotson ...................... 235/145 R
2010/0041439 A1* 2/2010 Bullister ....................... 455/566
2010/0289748 A1* 11/2010 Ryu .............................. 345/169
2013/0334020 A1* 12/2013 Lan .............................. 200/5 A

FOREIGN PATENT DOCUMENTS

TW        I270807        1/2007
TW        M419143        12/2011

* cited by examiner

*Primary Examiner* — Hung Duong
(74) *Attorney, Agent, or Firm* — Li & Cai Intellectual Property (USA) Office

(57) ABSTRACT

A foldable keyboard includes a first input module, a second input module, a folding support member, a magnetic element and a ferromagnetic element. The magnetic element and the ferromagnetic element put on the second input module and the folding support member separately that the folding support member can close with the second input module. Using magnetic element avoid wearing away by traditional fastener and reducing the complexity of production.

7 Claims, 6 Drawing Sheets

FOLDABLE KEYBOARD

BACKGROUND OF THE INSTANT DISCLOSURE

1. Field of the Instant Disclosure

The instant disclosure relates to a foldable keyboard; in particular, to a foldable keyboard comprising a folding support member having magnetic latch that can be used to retain the foldable keyboard in a folded position.

2. Description of Related Art

As potable electronic devices, with touch panel, such as tablet computer and smartphone, becoming increasingly popular, user have become accustomed to providing input through typing on the touch screen, because most of compact electronic devices are not equipped with physical keyboards. However, while being intuitive and convenient for casual usage, the touching input method can only support limited typing speed. When a user needs to provide input of great volume, on screen input method through touch panes becomes impractical to. Thus, the compact foldable keyboards are provided to address this problem.

Taiwan Patent NO. 1270807 discloses a foldable keyboard that comprises two key portions: an upper cover and a lower cover. The upper cover and lower cover are configured to snap onto each other through a mechanical latch to provide a placing space, and the two key portions, while in the folded state, can place in the placing space. Moreover, the upper cover is configured to support an electronic device. However, the mechanical latch, which is made by plastic material, wears out relatively easily, thus reduce the durability of the product.

Taiwan Patent NO. M419143 discloses a foldable keyboard comprising a left keyboard module and a right keyboard module assembled together through a connection module including a shaft, a subsidiary board, a pin axis and a plug. The right keyboard module and left keyboard module can rotate freely around the axis defined by the connection module. Thereby, the keyboard can be folded. However, the connection is complicated with a amount of components, which translates to higher production cost and manufacture complexity.

To address the above issues, the inventions strive via industrial experience and academic research to present the instant disclosure, which can effectively improve the limitations described above.

SUMMARY OF THE INSTANT DISCLOSURE

The object of the instant disclosure is to provide a foldable keyboard which has a slidable and rotatably folding support member to be put electronic device. The folding support member is sucked with the keyboard by magnetism to fix keyboard after folding. The traditional fastener on the folding support member is smaller, so the time of manufacture is longer to get higher accuracy. The way of fixing can save time to abject pattern and avoid the fracture on the traditional fastener. On the other hand, it don't need change the appearance for fixing.

In order to achieve the aforementioned object, according to an embodiment of instant disclosure, the foldable keyboard includes a first input module, a second input module, a folding support member, a magnetic element and a ferromagnetic element. The magnetic element is arranged on the second input module, and the ferromagnetic element is arranged on the first input module. The second input module and the folding support member are respectively pivotally connected to two adjacent sides of the first input module, thereby establishing pivotal connection between the first and the second input modules in a side by side configuration.

The magnetic element on the second input module and the ferromagnetic element on the folding support member are arranged in such a way that, when the second input module is folded toward the first input module and the folding support member is folded toward the second input module, the magnetic element and the ferromagnetic element magnetically latched onto each other. Thereby, the folding support member serves as a latch that can retain the foldable keyboard in a folded configuration.

According to another embodiment, the instant disclosure further provides a hinge module comprising a C-clip, and the first input module and the second input module are connected through the hinge module.

The instant disclosure provides a foldable keyboard having simplified structure and lower production cost through the use of magnetic/ferromagnetic elements as latching mechanism, which may avoid mechanical wearing of the traditional fastener, thus prolonging the operational life-time of the product.

In order to further the understanding regarding the present invention, the following embodiments are provided along with illustrations to facilitate the disclosure of the present invention.

DETAILED DESCRIPTION OF THE PREFERRED EMBODIMENTS

The instant closure provides a foldable keyboard 100 for use with an electronic device without a physical keyboard, such as tablet computer and smartphone. Please refer to FIG. 1, the foldable keyboard 100 comprises a first input module 10, a second input module 20, and a folding support member 30. The first input module 10 and the second input module 20 are arranged side by side and pivotally connected. The folding support member 30 is connected with the side of the first input module which next to the inside.

Figure 1:
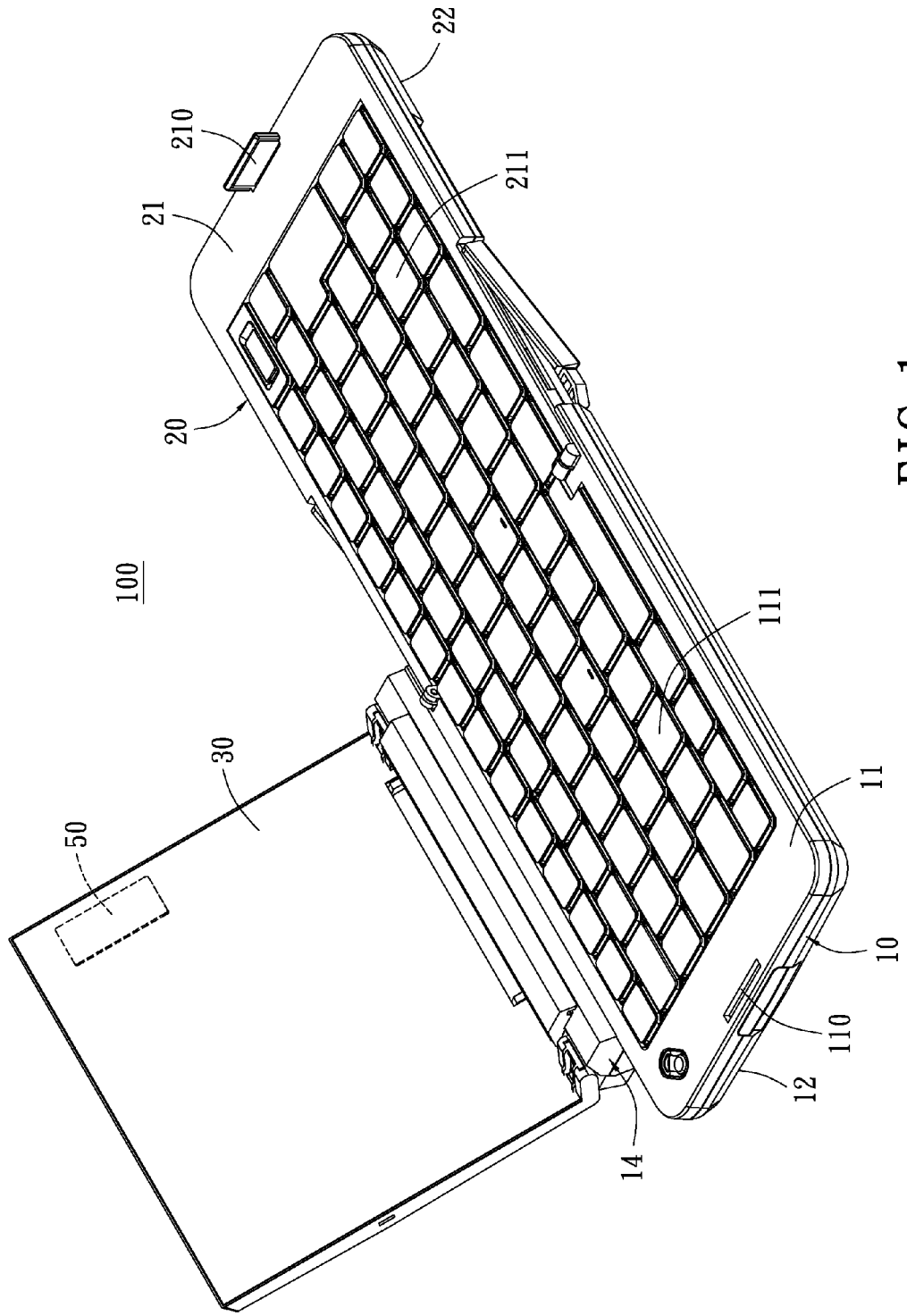
FIG. 1 shows a three-dimensional assembled view of the foldable keyboard of the instant disclosure.
Figure 2:
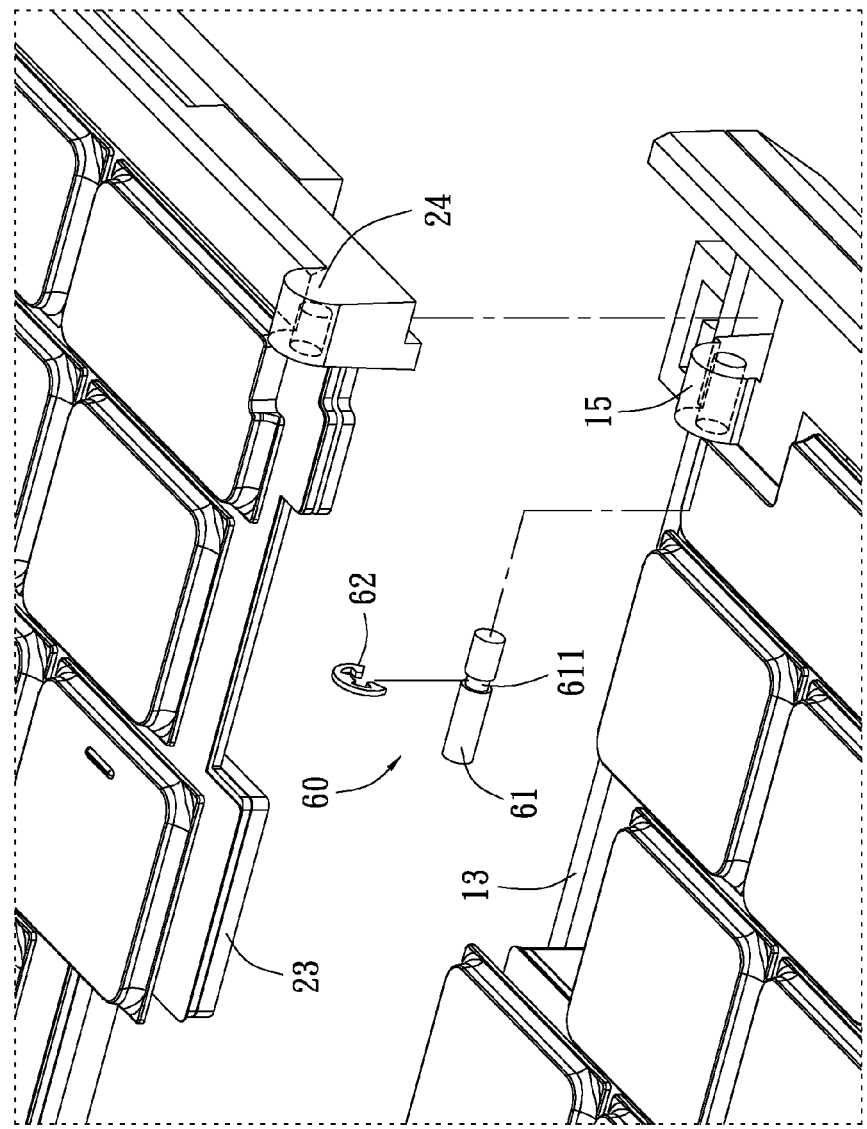
FIG. 2 show a three-dimensional exploded view of the hinge module of the foldable keyboard of the instant disclosure.

FIG. 2 shows a partial enlargement of the pivotal connection between the first input module 10 and the second input module 20. Please refer to FIG. 1 and FIG. 2, the first input module 10 have a top surface 11, a bottom surface 12 opposing the top surface 11, a hinging side 13, a connecting side 14 adjacent to the hinging side 13, and a shaft seat 15 on the hinging side 13. The top surface 11 of the input module 12 has a first key portion 111, and the connecting side 14 could have a slide rail.

The second input module 20 has a top surface 21, a bottom surface 22 opposing the top surface 21, a hinging side 23, and a hinging seat 24 on the hinging side 23. The top surface 21 of the second input module 20 has a second key portion 211. The first key portion 111 and the second key portion 211 respectively house a plurality of keys.

Referring to FIG. 2, the first input module 10 and the second input module 20 are pivotally connected to each other through a hinge module 60. In this exemplary embodiment, the hinge module 60 has a shaft 61 and a C-clip 62. The shaft 61 pierces through the shaft seat 15 and the hinging seat 24. The shaft 61 has a flute 611 between the shaft seat 15 and the hinging seat 24, and the C-clip 62 clamps on the flute 611 tightly, preventing the shaft 31 from separating with the shaft seat 15 and the hinging seat 24 when the foldable keyboard 100 is moved or shaken. That means the shaft 61 may be separated from the shaft seat 15 and the hinging seat 24 through the removal of the C-clip 62. The first input module 10 and the second input module 20 could rotate from a flat configuration to a folded configuration.

Because of the hinge module 60, the foldable keyboard can be taken apart or re-assembled easily, the first input module 10 and the second input module 20 can be hinged steadily to reduce the chance of separation while in use.

Figure 3:
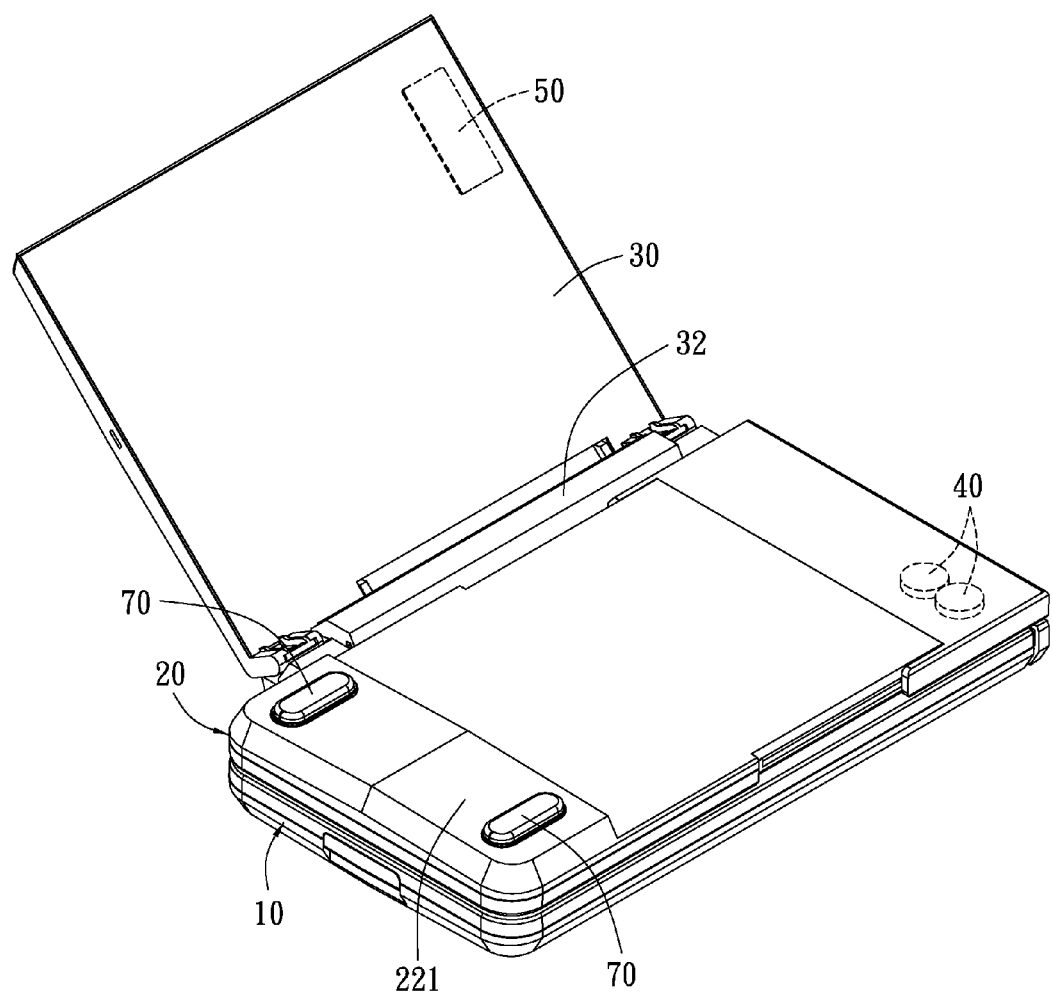
FIG. 3 show a three-dimensional exploded view of the foldable keyboard of the instant disclosure in folding state.

Please refer to FIG. 3 which shows that the second inputting 20 turn and cover with the first input module 10, the bottom surface 22 of the second input module 20 has a projection 221 which forms a drop space to provide that the folding support member 30 cover with the second input module 20. When the foldable keyboard 100 is flat, the projection 221 and the bottom surface 12 of the first input module 10 are coplanar. The projection 221 could have a non-slip gasket 70, at least one, to raise the friction between the foldable keyboard 100 and the table. Thereby, that avoids slipping for typing force, when the user is typing. The bottom surface 12 of the first input module 10 could have a non-slip gasket 70 too (not in Figs.).

With reference to FIG. 3, the first input module 10 and the second input module 20 are folding, and the folding support member 30 has an angle with the first input module 10 and the second input module 20. The folding state means that the first input module 10 and the second input module 20 are covered each other, and the first key portion 111 and the second portion 211 are face to face. The user can put the electronic device on the folding support member 30, so the electronic device has an angle with the first input module 10 to make the user convenient to watch. With reference to FIG. 1, in this exemplary embodiment, the first input module 10 has a groove 110, and the second input module 20 has a tenon 210. The groove 110 and the tenon 210 help the second input module 20 to fix on the first input module 10.

Figure 4:
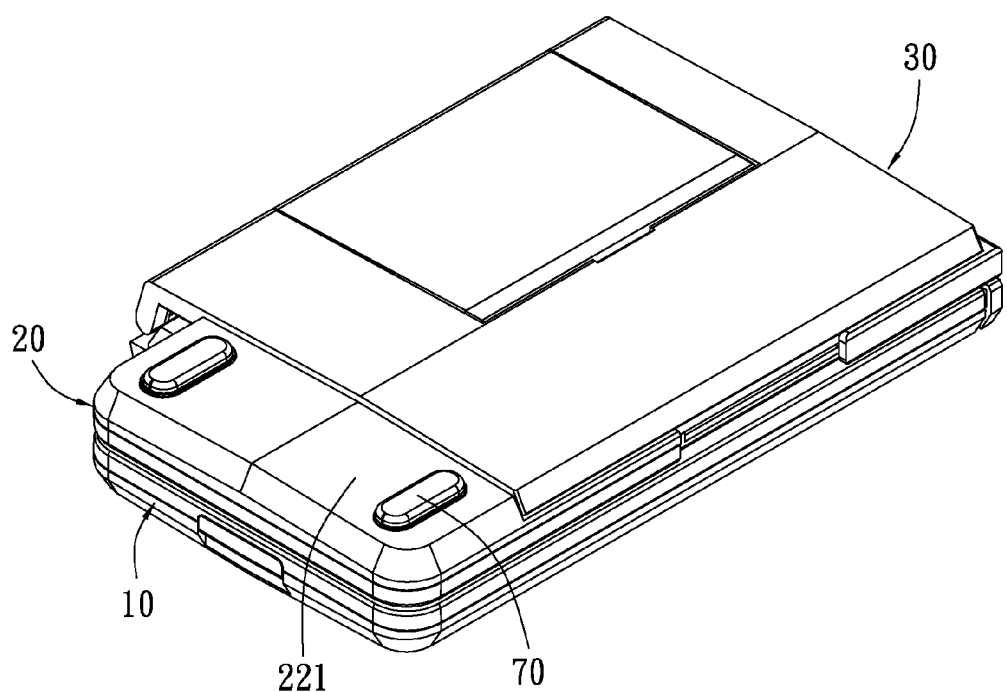
FIG. 4 shows a three-dimensional exploded view of the foldable keyboard of the instant disclosure in storage state.

With reference to FIG. 4, the storage state means that the first input module 10 and the second input module 20 are in the folding state and the folding support member 30 is covered with the second input module 20. The storage state provides a smaller keyboard which is easy to take.

Please refer to FIG. 3-4, the second input module 20 has a magnetic element 40 inside, and the folding support member 30 has an ferromagnetic element 50 inside or outside. The magnetic element 40 could be the two circular, rectangular or square magnetisms. The form and amount of the magnetic element 40 are not limited. To avoid interfering with the magnetic field when the electronic device is put on the folding support member 40, the ferromagnetic element 50 could be a tagger. The form of the ferromagnetic element 50 could be rectangular or circular, not limited.

When the foldable keyboard 100 is on the storage state, the magnetic element 40 relates with the ferromagnetic element 50, the folding support member 30 can be sucked with the second inputting 20 by magnetism. In this exemplary embodiment, fixing the folding support member 30 through the magnetic element 40 can simplify the structure. Thereby, the foldable keyboard 100 avoids wearing from traditional fastener, adjusting pattern long time, breaking easily and influencing appearance.

Figure 5:
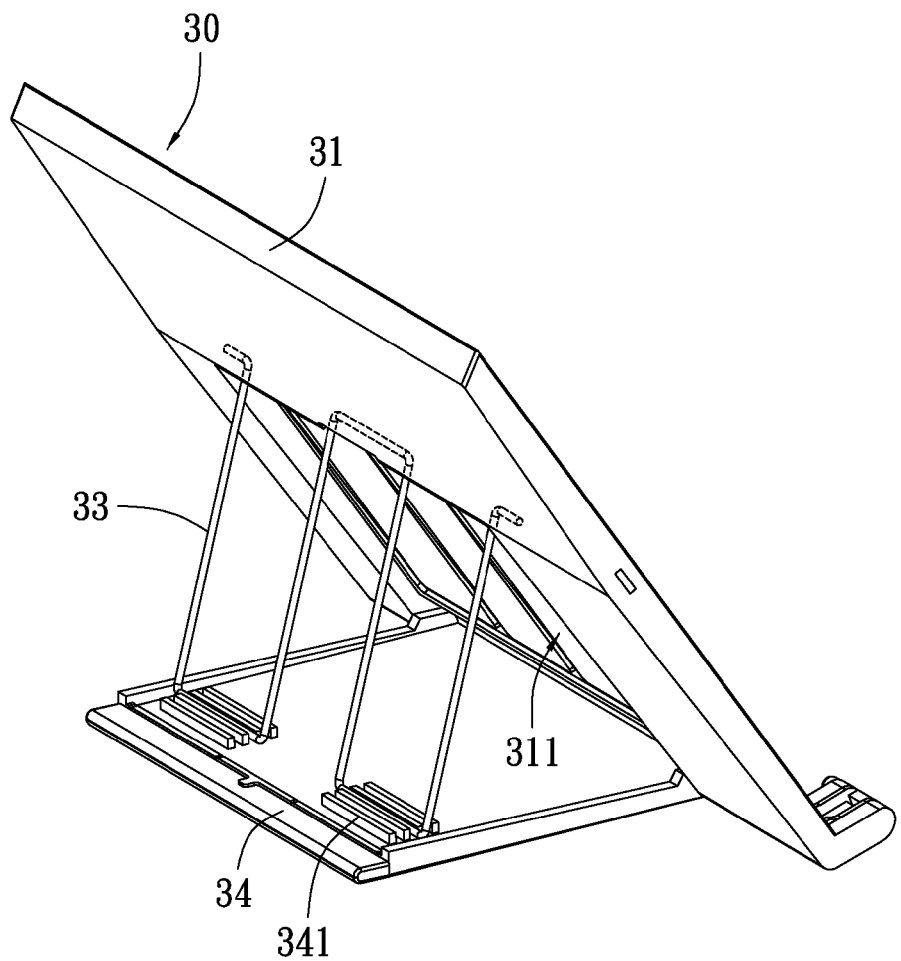
FIG. 5 shows three-dimensional assembled view of the folding support member the foldable keyboard of the instant disclosure.

Please refer to FIGS. 1, 3 and 5. The folding support member 30 have a supporting board 31, a slider 32, a supporting frame 33 and a under board 34. The slider 32 is connected with the connecting side 14 of the first input module 10 slidably. The supporting board 31 hinges with the two relative side of the slider 32. Thereby, the folding support member 31 can be slid along with the connecting side 14 of the first input module 10 and rotated to have an angle between the first input module 10 and the supporting board 31.

With reference to FIG. 5, the supporting frame 33 is hinged with the supporting board 31, and the place of hinging set on a face which doesn't front the top surface 21 of the second input module 20 in the storage state. The supporting frame 33 is formed with curve to like a piano wire. The top side of supporting frame 33 is hinged with the supporting board 31, and the bottom side of supporting frame 33 could touch and connect with the under board 34. Thereby, the supporting board 31 has a settling angle with the first input module.

The under board 34 is hinged with the side of supporting board 31 closed to the first connecting side 14. The under board 34 has several bumps 341. These bumps 341 are set abreast and parallelized to provide a gap, and the supporting frame 33 can be set in the gap. The amount of these bumps 341 decides how many settling angle the supporting board 31 have. When the user put the electronic device on the supporting board 31, the user can adjust the supporting frame 33 to set between these different bumps 341, and thereby have a different angle between the supporting board 31 and the under board 34.

With reference to FIG. 5, the folding support member 30 has a hollow space related to the shape and the height of the under board 34. The hollow space is a placing space 311. The placing space 311 have a piano wire notch related to the supporting frame 33, and the supporting frame 33 can be put in the notch. In the storage state, the under board 34 is put in the placing space 311, the supporting frame is set between the under board 34 and the supporting board 31.

In the exemplary embodiment, the foldable keyboard 100 is using. With reference to FIG. 1 first, the first input module 10 and the second input module 20 are in a flatting state, the flatting state means that the first input module 10 and the second input module 20 are coplanar. When the foldable keyboard 100 is in the flatting state, the user can put the electronic device in the folding support member 30.

Figure 6:
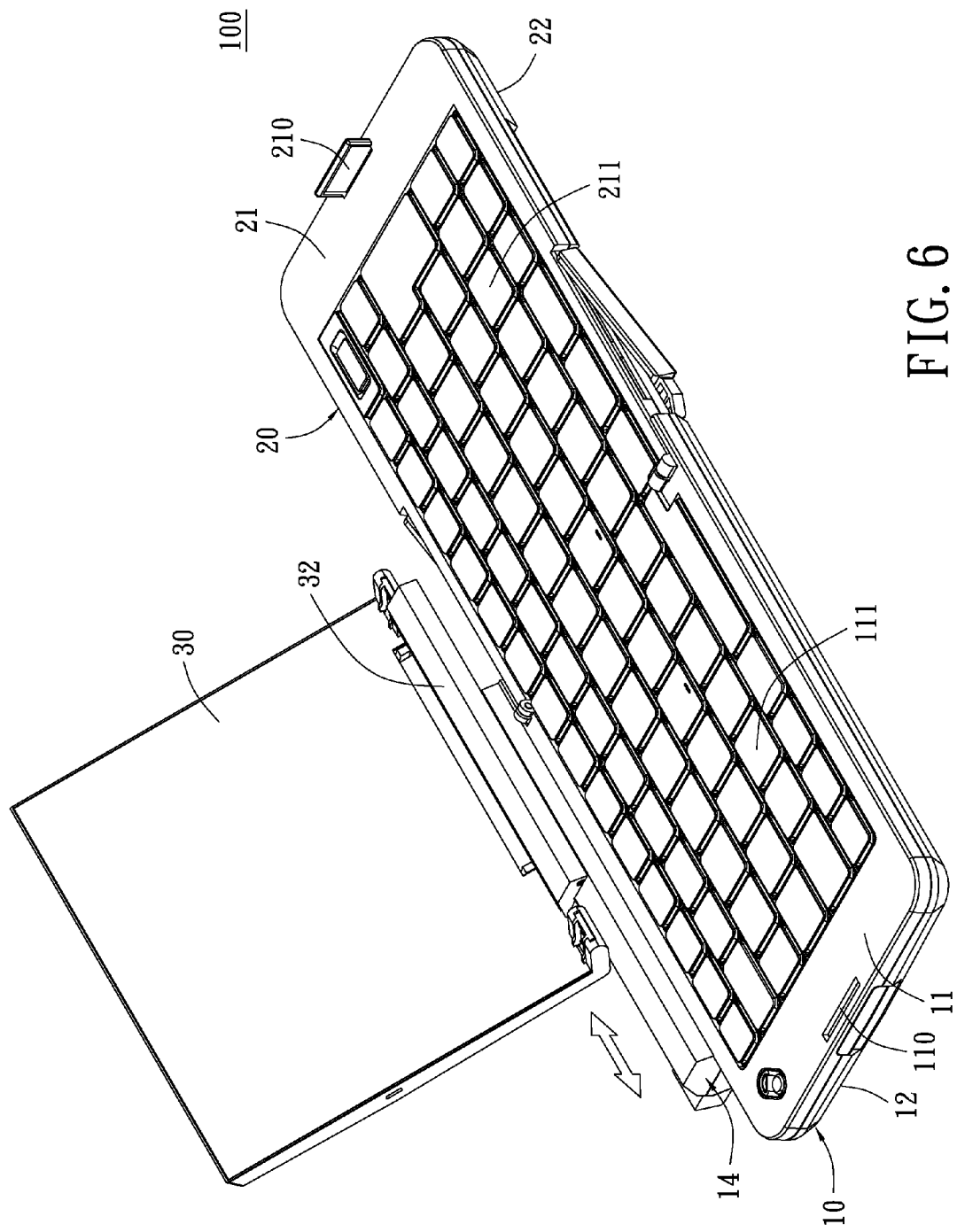
FIG. 6 shows a three-dimensional assembled view of the foldable keyboard of the instant disclosure in using state.

Please refer to FIGS. 5 and 6. In using the foldable keyboard 100, the folding support member 30 is provided an adjustable angle between the electronic device and the first input module 10 to adjust the angle of view of the electronic device. With reference to FIG. 6, the place of the electronic device on the foldable keyboard could be adjusted. The folding support member 30 are slid from the first input module 10 to the second input module 20 through the slider 32, that means the user could move the electronic device to the middle of the side of the foldable keyboard 100 extended from the connecting side 14. Thereby, the user's ray can be in front without strabismus and turning, when the user types message to the electronic device in using the foldable keyboard 100.

Based on the above, the instant disclosure has at least the following advantages:

1. In this instant disclosure, a magnetic element and a ferromagnetic element substitute for traditional fastener, that simplify the structure to reduce the effect of appearance and cost, and increase the time of product's life.

2. In this instant disclosure, the foldable keyboard is easy to take apart and difficult to separate in fixing through the hinge module having C-clip.

3. In this instant disclosure, the supporting board has several settling angles to be chosen by user.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A foldable keyboard, comprising:
a first input module having a top surface, a bottom surface, a hinging side, and a connecting side adjacent to the hinging side, the top surface having a first key portion;
a second input module having a top surface, a bottom surface, and a hinging side, the top surface having a second key portion, the hinging side of the second input module and the hinging side of the first input module being privotally connected;
a folding support member slidably and rotatably connected to the connecting side of the first input module;
a magnetic element disposed on the second input module; and
a ferromagnetic element disposed on the folding support member;
wherein magnetic element and the ferromagnetic element are correspondingly arranged so that when the foldable keyboard is in the folded configuration, the folding support member magnetically latches onto the second input module.

2. The foldable keyboard according to claim 1, wherein the first input module having at least one shaft seat, the second input module having at least one hinging seat, the first input module and the second input module connected through a hinge module, the hinge module comprising a shaft and a C-clip, the shaft comprising a groove, the C-clip clasped with the groove, the shaft pierced through the shaft seat and the hinging seat, and the groove setting between the shaft seat and the hinging seat.

3. The foldable keyboard according to claim 1, wherein the bottom surface of the second input module having a projection, the projection having a height related to the folding support member.

4. The foldable keyboard according to claim 3, wherein the projection and the bottom of the first inputting having at least one non-slip gasket separately.

5. The foldable keyboard according to claim 1, wherein the folding support member comprising a supporting board, a slider, a supporting frame and a under board, the slider connected with the connecting side, the under board pivotally connected with the supporting board next to a side of the first input module, the supporting pivotally connected with the supporting board.

6. The foldable keyboard according to claim 5, wherein the under board having a plurality bumps, the supporting frame set among the plurality bumps selectively.

7. The foldable keyboard according to claim 6, wherein the supporting board having a placing space, the placing space related to the under board.

* * * * *